(12) United States Patent
Gordon et al.

(10) Patent No.: US 9,165,288 B2
(45) Date of Patent: Oct. 20, 2015

(54) INFERRING RELATIONSHIPS BASED ON GEO-TEMPORAL DATA OTHER THAN TELECOMMUNICATIONS

(75) Inventors: Scot Douglas Gordon, Redmond, WA (US); Dmitry Kaplan, Bellevue, WA (US); Raul Vera, Aliso Viejo, CA (US)

(73) Assignee: Polaris Wirelesss, Inc., Mountain View, CA (US)

( * ) Notice: Subject to any disclaimer, the term of this patent is extended or adjusted under 35 U.S.C. 154(b) by 53 days.

(21) Appl. No.: 13/570,406

(22) Filed: Aug. 9, 2012

(65) Prior Publication Data

US 2014/0045530 A1    Feb. 13, 2014

(51) Int. Cl.
*H04W 24/00* (2009.01)
*G06Q 10/10* (2012.01)
*H04W 4/02* (2009.01)

(52) U.S. Cl.
CPC ............... *G06Q 10/10* (2013.01); *H04W 4/028* (2013.01)

(58) Field of Classification Search
CPC ................................ H04W 64/00; H04W 4/02

USPC ................ 455/456.2, 456.1, 456.3; 707/749; 709/204
See application file for complete search history.

(56) References Cited

U.S. PATENT DOCUMENTS

| | | | |
|---|---|---|---|
| 5,940,751 A | 8/1999 | Kaplan et al. | |
| 5,956,634 A | 9/1999 | Otterson et al. | |
| 5,970,405 A | 10/1999 | Kaplan et al. | |
| 8,224,348 B2 * | 7/2012 | Bolon et al. | 455/456.1 |
| 2011/0191352 A1 * | 8/2011 | Jones et al. | 707/749 |
| 2012/0278387 A1 * | 11/2012 | Garcia et al. | 709/204 |

* cited by examiner

*Primary Examiner* — Chuck Huynh
(74) *Attorney, Agent, or Firm* — Kaplan Breyer Schwarz & Ottesen, LLP (57) ABSTRACT

An illustrative geo-temporal analysis system analyzes telecommunications-event records and other records associated with wireless terminals to infer a collaborative relationship between users who do not telecommunicate with each other, based on how precisely a first geo-temporal pattern matches a second geo-temporal pattern. When a collaborative relationship is inferred, the system transmits an indication thereof and a request for an estimated location of the respective wireless terminals.

14 Claims, 7 Drawing Sheets

INFERRING RELATIONSHIPS BASED ON GEO-TEMPORAL DATA OTHER THAN TELECOMMUNICATIONS

FIELD OF THE INVENTION

The present invention relates to wireless networks in general, and, more particularly, to analyzing wireless data.

BACKGROUND OF THE INVENTION

Figure 1:
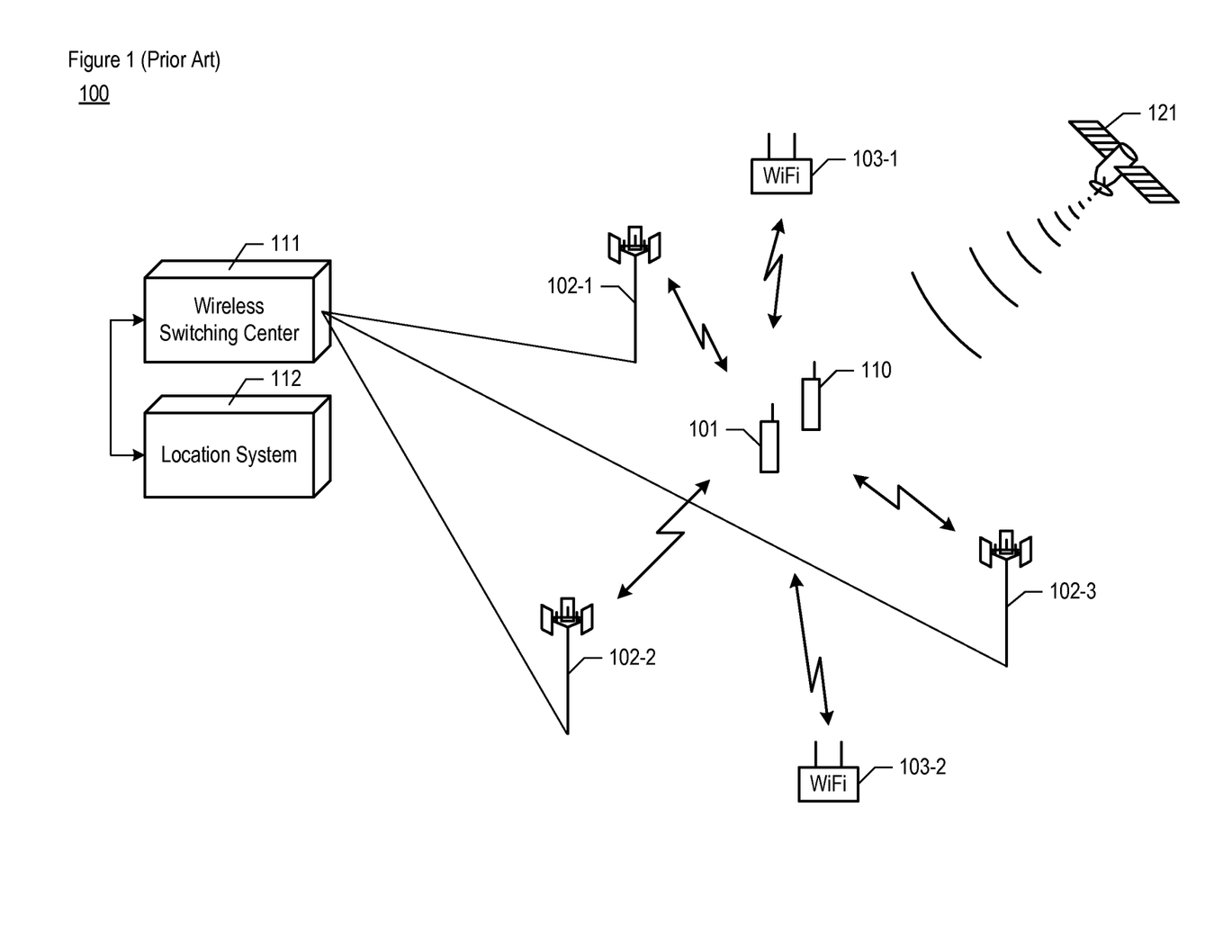
FIG. 1 depicts a diagram of the salient components of wireless telecommunications network 100 in accordance with the prior art.

FIG. 1 depicts a diagram of the salient components of wireless telecommunications network 100 in accordance with the prior art. Wireless telecommunications network 100 comprises: wireless terminals 101 and 110, cellular base stations 102-1, 102-2, and 102-3, Wi-Fi base stations 103-1 and 103-2, wireless switching center 111, and location system 112. Wireless telecommunications network 100 provides wireless telecommunications service to all wireless terminals within its coverage area, in well-known fashion. Global Positioning System ("GPS") constellation 121 is also depicted in FIG. 1, but is not part of wireless network 100.

Data that is generated by wireless network 100 can provide clues to the investigator. For example, a suspect's calling records can be obtained to determine what telephone and/or data communications that suspect has engaged in. Network-supplied calling records are well known in the art, and a calling record typically comprises one or more of:

an International Mobile Subscriber Identity ("IMSI") number that is assigned to the wireless terminal of the subscriber, or to a removable and swappable subscriber identification module ("SIM") card that is receivable in the wireless terminal, the telephone number assigned to the subscriber's account,
the origination time of the call,
the ending time of the call,
the origination time of a text (e.g., SMS) message,
the receiving time of a text (e.g., SMS) message, and
cell ID or enhanced cell ID location information (as is well known in the art) relative to the respective times.

These records are often referred to as "call-detail records" or "CDRs."

Identifying potential suspects according to telephone calling records and CDRs is well known in the art, but is limited because those who seek to avoid detection or surveillance can work around these records. Moreover, when investigating a crime, a terrorist attack, a missing persons case, a threat, and like situations, the cost of a false positive is high. A falsely identified suspect can be irreparably harmed by a false positive. Conversely, the true suspect or perpetrator remains at large. Therefore, investigators would benefit from automated tools that can help minimize the incidence of false positives.

SUMMARY OF THE INVENTION

The present inventors recognized that the traditional approach of investigating people according to calls they made and received presupposes that suspects telecommunicate directly with each other, be it by voice, text, email, instant messaging, other data communications, etc. When a person does not directly telecommunicate with a known suspect to avoid detection, there are no records of direct telecommunications between them, so it would be useful to infer a relationship based on the actors' geographic and temporal behaviors instead. The present inventors recognized that location data in telecommunications-event records and in other records can be exploited to glean users' geo-temporal patterns (i.e., patterns of location and/or movement over time), even when the users are not actively using their wireless terminals and even when there is no direct telecommunications between them. In this way, location data in the records is exploited independently of the telecommunications events occurring at the wireless terminal.

Telecommunications-events records according to the illustrative embodiment are not merely traditional call-detail records that report on calls and/or texts (i.e., text messages or SMS messages) that are made and received. Rather, the illustrative telecommunications-event records additionally:

(i) report on telecommunications events that are non-call-related (i.e., are not related to making, ending, and receiving calls and texts, but instead report on other telecommunications events such as power up, power down, location area updates, attach, detach, etc. where no call or text message is necessarily involved), and also (ii) comprise location data corresponding to the reported-on telecommunications events, and which location data is of finer resolution than the traditional cell ID or Enhanced Cell ID in prior-art CDRs.

Therefore, as to a given user over the course of time, more telecommunications-event records are illustratively generated than CDRs, and moreover, the location data reported in each record is of a sufficiently fine resolution that the user's location can be pinpointed with substantial accuracy such that substantial movement by the user from a first location to a second location can be discerned by the illustrative system. By contrast, prior-art CDRs reporting on a user who moves within the geographic area of a cell would not indicate movement when the location data in the CDRs is limited to cell ID.

The illustrative embodiment is a "geo-temporal analysis system" that analyzes and evaluates telecommunications-event records and other relevant records to detect, discern, generate, measure, compare, and evaluate geo-temporal patterns. Thus, the illustrative embodiment exploits the relatively fine resolution of available geo-temporal data to draw inferences about co-located actors, and to detect movement of actors from one location to another. Coupling the relatively fine temporal resolution given by more telecommunications events with the relatively fine resolution of the corresponding location data enables the illustrative embodiment to produce a more meaningful and precise geo-temporal analysis. The illustrative system also optionally uses other relevant records that do not report on telecommunications events, but which enrich the amount of geo-temporal information that is available for the illustrative system to generate and analyze geo-temporal patterns.

A geo-temporal pattern comprises geo-location and time-related attributes over a period of time, but is not based on direct telecommunications between the actors. Rather, the geo-temporal pattern is preferably based on the location data extracted from the telecommunications-event records and from the other records available to the illustrative embodiment. A geo-temporal pattern may be geo-locationally static, i.e., anchored to a particular location, or dynamic, i.e., based on a series of locations that are traversed by the wireless terminal in the course of time. And, as noted above, the location data may be gleaned from call-related events or from non-call-related events or a combination of both. Accordingly, the illustrative embodiment infers whether two candidate wireless-terminal users have a collaborative relationship even when they do not have direct telecommunications between them, based on:

(i) how precisely each candidate's geo-temporal pattern matches a pre-defined geo-temporal pattern, e.g., the geo-temporal pattern of a known suspect, and/or (ii) how precisely a first candidate's geo-temporal pattern matches the geo-temporal pattern of another candidate.

The inference of collaboration arises from the theory that collaborators, even while they avoid direct telecommunications, will meet in a common location according to a discernible pattern, or perhaps have a dead-drop arrangement that involves a common location and a time offset. In a first example, collaborators regularly meet in a coffee shop, a park, or at someone's residence but do not directly telecommunicate. In a second example, collaborators have a dead-drop arrangement wherein a first person leaves an object or a mark at a first location and a second person arrives at that first location within a certain time frame to check for the object or mark. Again, there are no direct telecommunications between the first and second person. In these examples, the illustrative embodiment infers whether there is a collaborative relationship among the wireless users based on their respective geo-temporal patterns.

After identifying a candidate wireless terminal as a suspect, the illustrative geo-temporal analysis system transmits the newly gleaned and generated information to other systems, to a data store, to a wireless terminal, and/or to a display, etc. Further, the system also transmits a request for a real-time location estimate for the identified suspect wireless terminals, thus enabling the investigator to begin immediate tracking or surveilling of the suspected collaborators. As noted, one of the objectives of the present invention is to reduce the number of potential targets in an investigation from an unmanageably large number (e.g., tens of thousands of wireless users in a city) to a manageable few tens or maybe hundreds.

A system according to the illustrative embodiment comprises:
  a receiver for receiving a first plurality of records that are associated with a first wireless terminal;
  a processor for generating, when a first geo-temporal pattern of the first wireless terminal is substantially similar to a second geo-temporal pattern, an indication of a collaborative relationship between a first user of the first wireless terminal and a second user who corresponds to the second geo-temporal pattern, wherein the first geo-temporal pattern is based on location data in the first plurality of records; and
  a transmitter for transmitting at least one of:
    (i) the indication of the collaborative relationship, and
    (ii) a request for a location estimate of the first wireless terminal.

A method according to the illustrative embodiment comprises:
  receiving, by a data-processing system, a first plurality of records that are associated with a first wireless terminal;
  when a first geo-temporal pattern of the first wireless terminal is substantially similar to a second geo-temporal pattern, generating, by the data-processing system, an indication of a collaborative relationship between a first user of the first wireless terminal and a second user who corresponds to the second geo-temporal pattern, wherein the first geo-temporal pattern is based on location data in the first plurality of records; and
  transmitting at least one of:
  (i) the indication of the collaborative relationship, and
  (ii) a request for a location estimate of the first wireless terminal.

DETAILED DESCRIPTION

For the purposes of this specification, the following terms and their inflected forms are defined as follows:
  The term "geo-temporal attribute" is defined as a characteristic that is associated, or can be associated, with a wireless terminal and comprises (i) a datum that indicates a location, and (ii) a temporal datum that is associated with the location, e.g., a point in time, a period of time, a duration, etc. Examples of geo-temporal attributes are provided elsewhere herein.
  The term "geo-temporal data" is defined as data that comprises (i) a datum that indicates a location, and (ii) a temporal datum that is associated with the location, e.g., a point in time, a period of time, a duration, etc.
  The term "geo-temporal pattern" is defined as a composite of attributes of a wireless terminal, including at least one geo-temporal attribute. In addition to one or more geo-temporal attributes, a geo-temporal pattern may also comprise other attributes, such as the type of wireless terminal, or certain kinds of calls associated with the wireless terminal. A geo-temporal pattern typically reflects attribute data that was gathered over an extended period of time, e.g., days, weeks, months, etc. but is not so limited. Examples of geo-temporal patterns are provided elsewhere herein.
  The term "location" is defined as any one of a zero-dimensional point, a one-dimensional line, a two-dimensional area, or a three-dimensional volume. Thus, a location can be described, for example, by a street address, geographic coordinates, a perimeter, a geofence, a cell ID, or an enhanced cell ID.
  The term "geofence" is defined as a virtual perimeter surrounding a geographic area.
  The term "telecommunications event" is defined as any occurrence involving electronic communications over a distance between a (wired or wireless) terminal and another entity in the context of the serving network (such as a base station controller, a switching center, an antenna, another terminal, etc.)—whether the involved telecommunications are wireless or wired (including electrical, optical, wire, and/or fiber) or a combination of wireless and wired. Typically, in the present context, a telecommunications event occurs between a wireless terminal and an element of wireless network 200. Examples of telecommunications events appear elsewhere herein.

Figure 5:
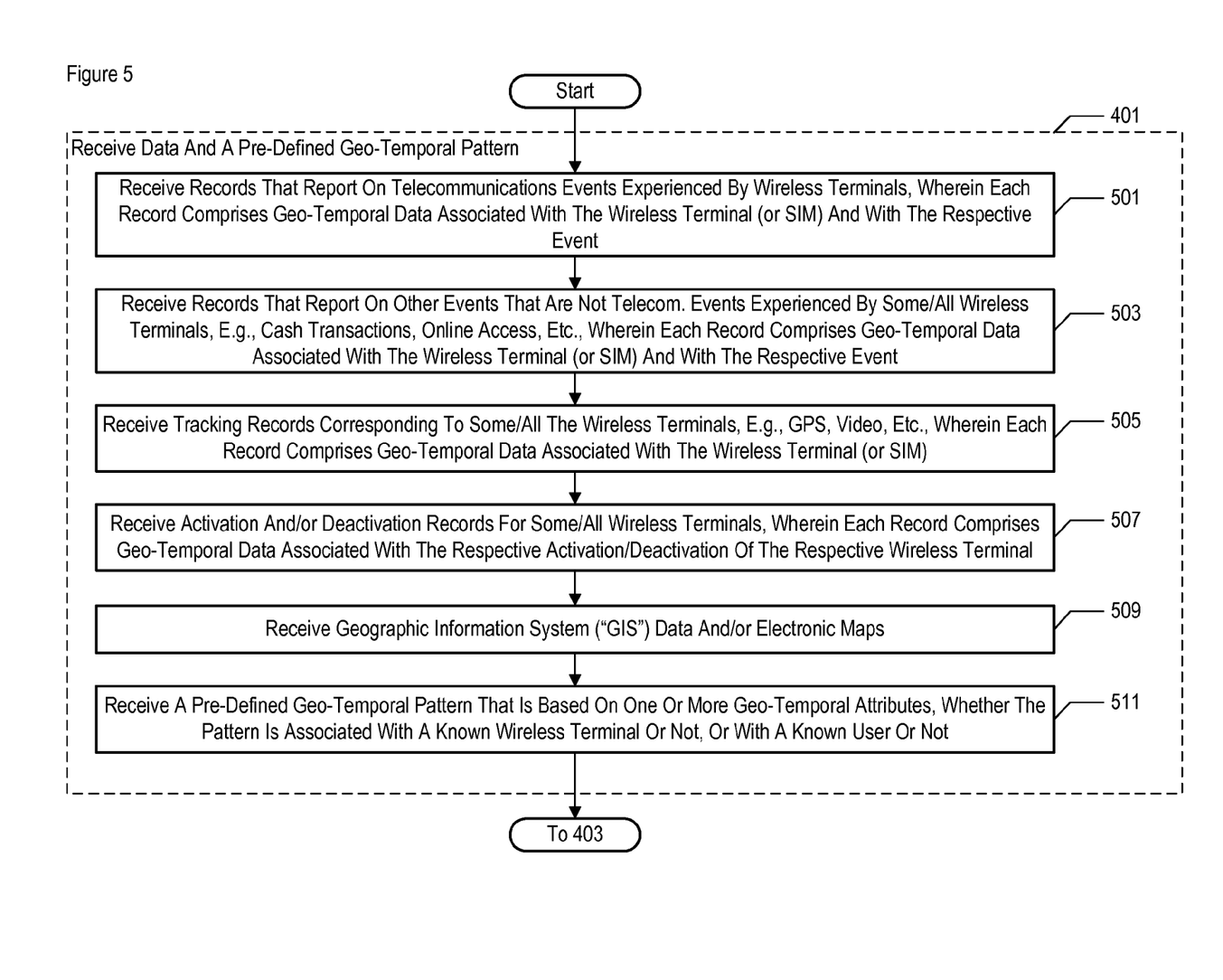
FIG. 5 depicts a flowchart of the salient sub-operations of operation 401 performed in accordance with the illustrative embodiment.

The term "other events that are not telecommunications events" is defined as occurrences experienced by a wireless terminal, but which are not telecommunications events, e.g., conducting a financial transaction from the wireless terminal, receiving a GPS location from a GPS satellite, passing through a toll-booth, etc. Records reporting on other events that are not telecommunications events, i.e., "other-event records," are illustratively received by geo-temporal analysis system 213 in operations 503 through 507. Examples of other events that are not telecommunications events are implicitly given in regard to the corresponding other-event records as described for operations 503-507.

The term "telecommunications-event record" is defined as a record that is generated as a result of a telecommunications event that is experienced by the reported-on wireless terminal. The telecommunications-event record comprises (i) geo-temporal data associated with the telecommunications event, and (ii) the IMSI of the wireless terminal or SIM card that experienced the telecommunications event. The reported-on telecommunications event is associated with the wireless terminal (or SIM card), whether the event is reported by the wireless terminal itself or by another element of the wireless network, e.g., a base station controller, or is detected by a probe. The reported-on location information in the geo-temporal data is preferably of a finer resolution than mere cell ID or enhanced cell ID. Examples of telecommunications-event records appear elsewhere herein.

The term "direct telecommunications" is defined as any telecommunications that occurred between a first wireless terminal and another entity, e.g., a call between two wireless terminals, a conference call among three wireless terminals, a text message from a first wireless terminal to another wireless terminal, an email from one wireless terminal to another wireless terminal or from a first user to a second user having a different online identity, or a signal transmitted from a wireless terminal to a base station, etc. without limitation. Illustratively, a direct telecommunication between two terminals will result in one or more telecommunications-event records.

The term "wireless terminal" is defined as an apparatus that:
(i) receives signals from another apparatus without a wire, or
(ii) transmits signals to another apparatus without a wire, or
(iii) both (i) and (ii).

This term is used synonymously herein with the following terms: wireless telecommunications terminal, user equipment, mobile terminal, mobile station, mobile handset, and mobile unit.

Figure 2:
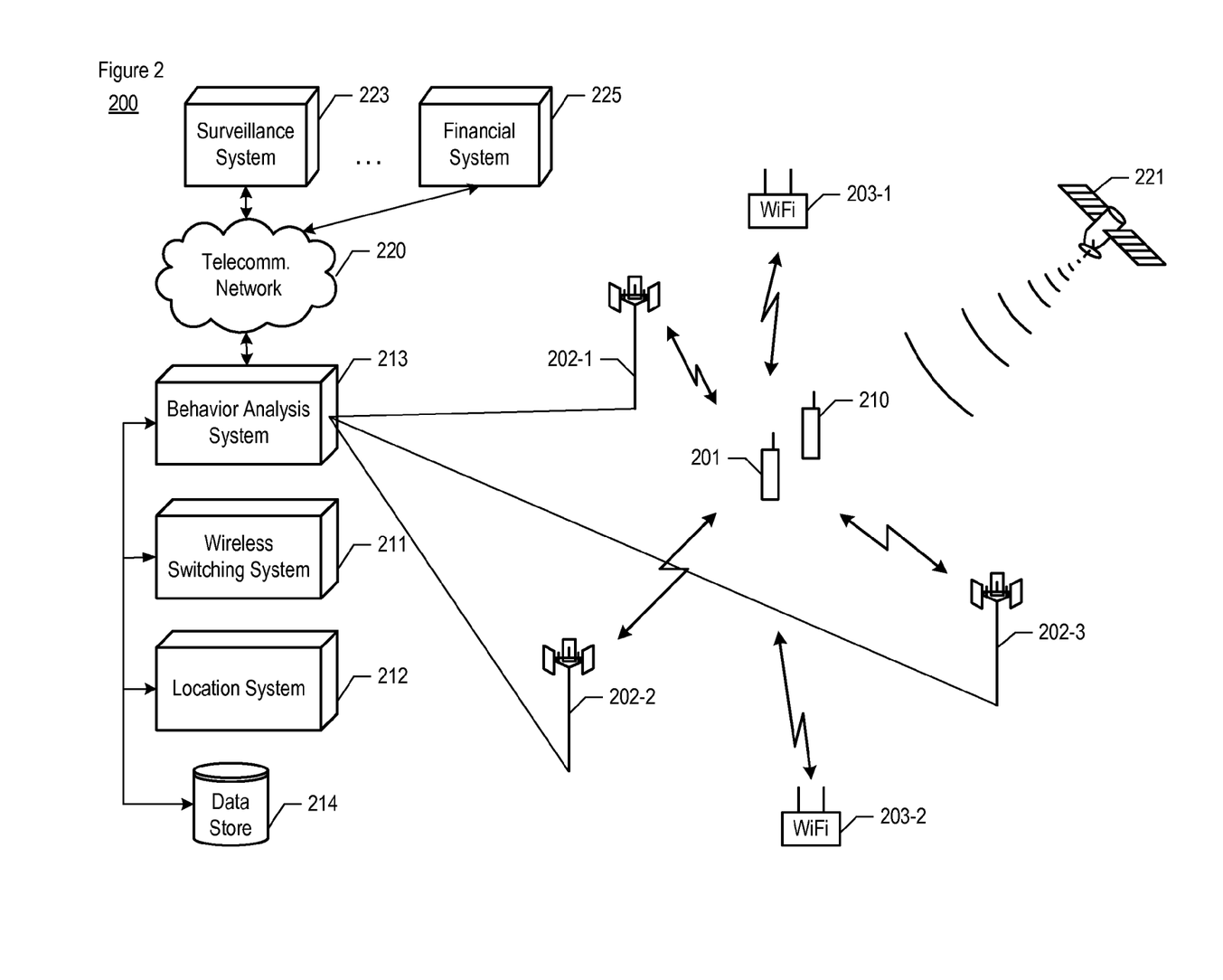
FIG. 2 depicts a diagram of the salient components of wireless telecommunications network 200 in accordance with the illustrative embodiment of the present invention.

FIG. 2 depicts a diagram of the salient components of wireless telecommunications network 200 in accordance with the illustrative embodiment of the present invention. Wireless network 200 comprises wireless terminals 201 and 210, cellular base stations 202-1, 202-2, and 202-3, Wi-Fi base stations 203-1 and 203-2, wireless switching center 211, location system 212, geo-temporal analysis system 213, and data store 214, which are interrelated as shown. Wireless network 200 provides wireless telecommunications service to all wireless terminals within its coverage area in well-known fashion; in addition, geo-temporal analysis system 213 performs and coordinates the operations as described in more detail below. Global Positioning System ("GPS") constellation 221 is also depicted in FIG. 2, but is not part of wireless network 200. Likewise, telecommunications network 220, surveillance system 223, and financial system 225 are also depicted in FIG. 2, but are not part of wireless network 200. Other external systems also are connected to geo-temporal analysis system 213 via telecommunications network 220 but are not expressly depicted in FIG. 2, e.g., a facial recognition system, a GPS tracking system, a credit reporting system, a roadway-traffic camera system, a roadway toll-booth system, etc., without limitation.

In accordance with the illustrative embodiment, wireless telecommunications service is provided to wireless terminals 201 and 210 (whether at the same time or at different times) in accordance with the air-interface standard of the 3rd Generation Partnership Project ("3GPP"). Examples of 3GPP air-interface standards include GSM, UMTS, and LTE. After reading this disclosure, however, it will be clear to those skilled in the art how to make and use alternative embodiments of the present invention that operate in accordance with one or more other air-interface standards (e.g., CDMA-2000, IS-136 TDMA, IS-95 CDMA, 3G Wideband CDMA, IEEE 802.11 Wi-Fi, 802.16 WiMax, Bluetooth, etc.) in one or more frequency bands.

Wireless terminals 201 and 210 each comprises the hardware and software necessary to be 3GPP-compliant and to perform the processes described below and in the accompanying figures. Wireless terminals 201 and 210 are mobile. For example and without limitation, wireless terminals 201 and 210 each is capable of:

measuring one or more traits of each of one of more electromagnetic signals (received from cellular base stations 202-1, 202-2, and 202-3 and Wi-Fi base stations 203-1 and 203-2) and of reporting the measurements to location engine 214, and transmitting one or more signals to cellular base stations 202-1, 202-2, and 202-3 and Wi-Fi base stations 203-1 and 203-2, including reports of telecommunications events experienced by the respective wireless terminal, and receiving service from one or more of cellular base stations 202-1, 202-2, and 202-3 and Wi-Fi base stations 203-1 and 203-2.

Illustrative examples of telecommunications events that are experienced and reported by wireless terminals 201 and/or 210 include without limitation:

a. an origination of a voice call by the wireless terminal,
b. a receiving of a voice call by the wireless terminal,
c. an establishment of a voice call between the wireless terminal in the wireless network and another telecommunications terminal, whether in the network or elsewhere, i.e., establishing a call connection,
d. an origination of a Short Message Service ("SMS") message by the wireless terminal,
e. a receiving of an SMS message by the wireless terminal,
f. an origination of a text message by the wireless terminal,
g. a receiving of a text message by the wireless terminal,
h. a location update request that is transmitted by the wireless terminal to an element of the network infrastructure, wherein the location update request is caused by at least one of the following occurrences:
  i. powering on the wireless terminal,
  ii. detecting by the wireless terminal that it is in a new location area,
  iii. originating a data session by the wireless terminal,
  iv. a handover of the wireless terminal from one serving cell to another cell,
  v. an International Mobile Subscriber Identity ("IMSI") detach message that is transmitted by the wireless terminal, vi. a powering off by the wireless terminal, vii. an International Mobile Subscriber Identity ("IMSI") attach message that is transmitted by the wireless terminal when it powers on, and viii. a powering on by the wireless telecommunications terminal, i. an origination by the wireless terminal of an Unstructured Supplementary Service Data ("USSD") session, j. an origination of a data session by the wireless terminal, k. an ending of a data session by the wireless terminal, l. an activation, for the wireless terminal, of a packet data protocol ("PDP") context by a GPRS Support Node in the wireless network, m. a deactivation, for the wireless terminal, of a packet data protocol ("PDP") context by a GPRS Support Node in the wireless network, n. the wireless terminal attaching to a packet radio data network in the wireless network, and o. the wireless terminal detaching from the packet radio data network in the wireless network.

Telecommunications-event records are generated (as described below) that report on the above-listed telecommunications events, wherein each record also comprises geo-temporal data associated with the telecommunications event. It will be clear to those having ordinary skill in the art how to recognize and implement the corresponding terms, if any, for non-3GPP types of wireless networks.

Wireless terminals 201 and 210 each is illustratively a smartphone with both voice and data service provided and supported by wireless network 200 (whether both terminals are active at the same time or at different times). It will be clear to those having ordinary skill in the art, after reading the present disclosure, how to make and use wireless network 200 with wireless terminal 201 that is a cell phone, a data tablet, or a combination thereof. It will be clear to those having ordinary skill in the art, after reading the present disclosure, how to make and use wireless network 200 with wireless terminal 210 that is a cell phone, a data tablet, or a combination thereof. Wireless terminals 201 and 210 are illustratively in service at the same time, but need not be. It will be clear to those skilled in the art, after reading this disclosure, how to make and use alternative embodiments of the present invention that comprise any number of wireless terminals supported by wireless network 200.

Cellular base stations 202-1, 202-2, and 202-3 communicate with wireless switching center 211 by wire, and with wireless terminals 201 and 210 via radio frequencies ("RF") in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading the present disclosure, how to make and use alternative embodiments that comprise any number of base stations.

Cellular base stations 202-1, 202-2, and 202-3 comprise the hardware and software necessary to be 3GPP-compliant. For example and without limitation, cellular base stations 202-1, 202-2, and 202-3 are each capable of:

measuring one or more traits of each of one or more electromagnetic signals (transmitted by wireless terminal 201 and wireless terminal 210), and reporting the measurements to location system 212, detecting one or more of the telecommunications events occurring at wireless terminal 201 and wireless terminal 210, and transmitting one or more signals, and reporting the transmission parameters of those signals, and reporting telecommunications events to location system 212, and reporting on the above-enumerated telecommunications events associated with a wireless terminal.

Wi-Fi base stations 203-1 and 203-2 communicate with wireless terminals 201 and 210 via radio frequencies ("RF") in well-known fashion (whether at the same time or at different times). Wi-Fi base stations 203-1 and 203-2 have a shorter range than cellular base stations 202-1, 202-2, and 202-3, but sometimes have a higher bandwidth. Wi-Fi base stations 203-1 and 203-2 are each capable of, without limitation:

measuring one or more traits of each of one of more electromagnetic signals (transmitted by wireless terminal 201 and wireless terminal 210), and reporting the measurements to location system 212, and detecting one or more of the telecommunications events occurring at wireless terminal 201 and wireless terminal 210, and transmitting one or more signals, and reporting the transmission parameters of those signals, and reporting telecommunications events to location system 212, and reporting on the above-enumerated telecommunications events associated with a wireless terminal.

It will be clear to those having ordinary skill in the art how to make and use alternative embodiments comprising base stations (cellular, WiFi, etc.) and/or access points that are not capable of reporting transmission parameters and/or measurements to location system 212; in such configurations, it will be clear to those having ordinary skill in the art how to use probes to monitor the respective interface between the base station and/or access point and other network entities to gather measurement and event information from/about the wireless terminals and transmit the gathered information to a location system such as illustrative location system 212.

Wireless switching center 211 comprises a switch that orchestrates the provisioning of telecommunications service to wireless terminals 201 and 210 and the flow of information to and from location system 212, and geo-temporal analysis system 213, and data store 214, as described below and in the accompanying figures. Wireless switching center 211 collects data from throughout wireless network 200, including telecommunications events reports that are reported by wireless terminals and/or by base stations, and generates telecommunications-event records according to the telecommunications events that are listed above, without limitation. Illustratively, wireless switching center 211 collects location data from location system 212, from the base stations, and from wireless terminals 201 and 210. Each telecommunications-event record generated by wireless switching center 211 associates the reported-on telecommunications event with a geo-temporal datum that indicates a location and time at which the reported-on telecommunications event is estimated to have occurred. Wireless switching center 211 transmits the telecommunications-event records to geo-temporal analysis system 213 and to data store 214.

As is well known to those skilled in the art, wireless switching centers are also commonly referred to by other names such as mobile switching centers, mobile telephone switching offices, routers, packet data service nodes, GPRS support nodes, or a combination thereof, etc. Although the illustrative embodiment comprises one wireless switching center, it will be clear to those skilled in the art, after reading this disclosure, how to make and use alternative embodiments of the present invention that comprise any number of wireless switching centers. In accordance with the illustrative embodiment, all of the base stations servicing wireless terminals 201 and 210 are associated with wireless switching center 211. It will be clear to those skilled in the art, after reading this disclosure, how to make and use alternative embodiments of the present invention in which any number of base stations are associated with any number of wireless switching centers. It will be further clear to those having ordinary skill in the art, after reading this disclosure, how to make alternative embodiments wherein wireless switching center 211 is not the entity that generates the telecommunications-event records, and instead location system 212 generates these records; or location system 212 generates these records based at least in part on data gathered from probes; or a combination of center 211-generated and system 212-generated records; or the telecommunications-event records are generated by another system whether part of wireless network 200 or outside wireless network 200 and are made available to geo-temporal analysis system 213 for processing and analysis as described in further detail below.

Location system 212 comprises hardware and software that estimates one or more locations for wireless terminals 201 and 210. Preferably, location system 212 is a mass location system that provides geo-temporal data that is to be incorporated into telecommunications-event records, and further provides real-time geo-temporal data on demand, e.g., when geo-temporal analysis system so requests. According to the illustrative embodiment, location system 212 is the OmniLocate wireless location platform product from Polaris Wireless, Inc. OmniLocate is a mass location system that estimates a location that is associated with telecommunications events, including events other than call origination and call termination—events such as location area updates, powering on, powering off, etc. OmniLocate provides location capabilities across 2G (GSM/CDMA), 3G (UMTS/WCDMA), and emerging 4G (LTE) air interfaces, as well as indoor technologies such as Wi-Fi, DAS, and Femtocells. OmniLocate incorporates Polaris Wireless Location Signatures (Polaris WLS™) technology, which determines a wireless terminal's location by comparing radio measurements reported by the wireless device (or by a base station) against those in a comprehensive radio environment database. OmniLocate enables the ability to simultaneously locate all subscribers in a wireless network in real-time and on a historical basis.

Examples of telecommunications events that preferably elicit a location estimate from location system 212 are given above in reference to wireless terminals 201 and 210. Thus, the OmniLocate platform enables wireless switching center 211 to generate and provide more granular telecommunications-event records than standard call-detail records in the prior art, because OmniLocate estimates and transmits more precise location data, e.g., a 10-meter by 10-meter area, which is of a finer resolution than a cell ID or enhanced cell ID in the prior art. Also, the granularity of available data is further improved by the fact that more telecommunications events are captured and reported in these telecommunications-event records than in prior-art call-detail records. It will be clear to those having ordinary skill in the art, after reading the present disclosure, how to make and use alternative embodiments of the present invention wherein the records generated by location system 212 (preferably OmniLocate with Polaris WLS™) are transmitted to geo-temporal analysis system 213 without the need to incorporate the geo-temporal data into telecommunications-event records at wireless switching center 211. It will be clear to those having ordinary skill in the art, after reading the present disclosure, how to make and use alternative embodiments of the present invention that operate with a location system 212 other than the Polaris Wireless OmniLocate product. It will be clear to those having ordinary skill in the art, after reading the present disclosure, how to make and use alternative embodiments that use prior-art call-detail records; or that use prior-art cell ID and Enhanced cell ID for the location data.

Figure 4:
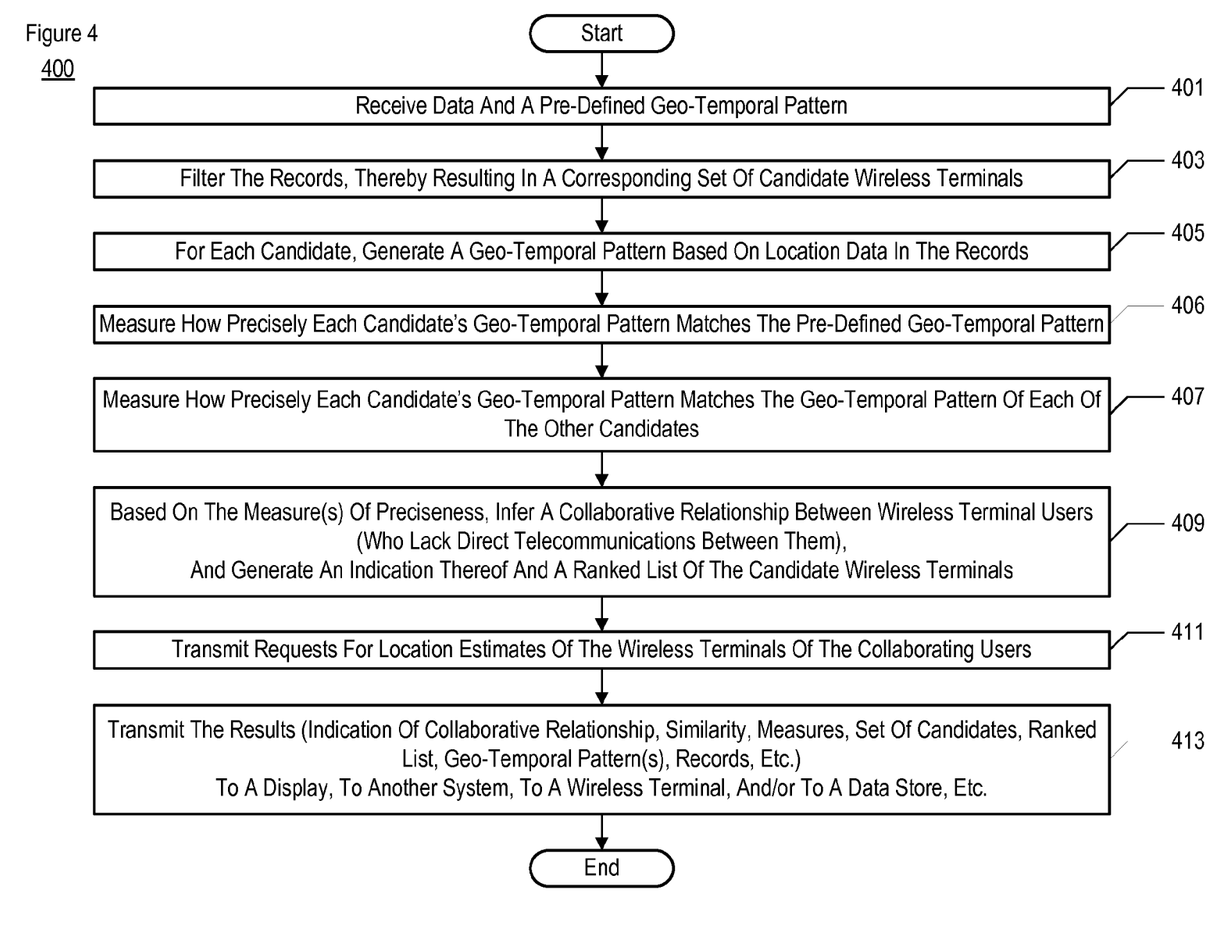
FIG. 4 depicts a flowchart of the salient operations of method 400 performed in accordance with the illustrative embodiment of the present invention.

Geo-temporal analysis system 213 is a data-processing system that comprises hardware and software, and that is configured to perform the geo-temporal analysis according to the illustrative embodiment of the present invention. Geo-temporal analysis system 213, which is an element of wireless network 200, executes and coordinates the operations described herein in reference to method 400, including wherein geo-temporal analysis system 213 communicates with external systems that are not part of wireless network 200. It will be clear to those having ordinary skill in the art, after reading the present disclosure, how to make and use alternative embodiments wherein geo-temporal analysis system 213 communicates with elements of wireless network 200, but is not an element thereof.

Data store 214 is a digital data storage system that is responsible for receiving data, storing data, archiving data, and retrieving data in a fashion that is well-known in the art. Illustratively, data store 214 is implemented as a hard disk drive that is part of wireless network 200. Illustratively, data store 214 receives the results of the analysis performed by geo-temporal analysis system 213 and archives these results along with the various records and data received by geo-temporal analysis system 213. It will be clear to those having ordinary skill in the art, after reading the present disclosure, how to make and use alternative embodiments wherein data store 214 communicates with elements of wireless network 200, but is not an element thereof.

Telecommunications network 220 is well known in the art and provides connectivity and telecommunications (voice and/or data) among the systems that connect to it, including geo-temporal analysis system 213, surveillance system 223, financial system 225, and other systems that are external to wireless network 200 but are not shown in FIG. 2, e.g., a facial recognition system, a GPS tracking system, a credit reporting system, a roadway-traffic camera system, a roadway toll-booth system, etc., without limitation.

Global Positioning System ("GPS") constellation 221 is well known in the art and provides precise location data to GPS-enabled wireless terminals and to any GPS-enabled system on Earth, including for example to a GPS tracking system (not shown) that telecommunicates with geo-temporal analysis system 213.

Surveillance system 223 is well known in the art and telecommunicates with geo-temporal analysis system 213 (illustratively via telecommunications network 220) to transmit surveillance records to geo-temporal analysis system 213. For example, surveillance system 223 provides records indicating that wireless terminal 201 is at a location that is under surveillance by surveillance system 223.

Financial system 225 is well known in the art and is illustratively a banking system that telecommunicates with geo-temporal analysis system 213 (illustratively via telecommunications network 220) to transmit financial records to geo-temporal analysis system 213, including bank account transactions, credit card transactions, debit card transactions, deposits, debits, transfers of funds, and other records that associate a user and/or a wireless terminal with these transactions; the records also preferably comprise geo-temporal data for the reported-on transactions.

As noted, other systems that are external to wireless network also are contemplated to telecommunicate with geo-temporal analysis system 213, e.g., a facial recognition system, a GPS tracking system, a credit reporting system, a roadway-traffic camera system, a roadway toll-booth system, etc., without limitation It will be clear to those having ordinary skill in the art, after reading the present disclosure, how to make and use alternative embodiments wherein geo-temporal analysis system 213 is incorporated into one of the other illustrated systems, e.g., location system 212, or wireless switching center 211, or surveillance system 223. It will be further clear to those having ordinary skill in the art, after reading the present disclosure, how to make and use alternative embodiments wherein geo-temporal analysis system 213 further comprises one or more of the other illustrated systems, e.g., location system 212 and/or wireless switching center 211 and/or data store 214. It will be further clear to those having ordinary skill in the art, after reading the present disclosure, how to make and use alternative embodiments wherein geo-temporal analysis system 213 telecommunicates directly with one or more external systems without the intervening services of telecommunications network 220.

Figure 3:
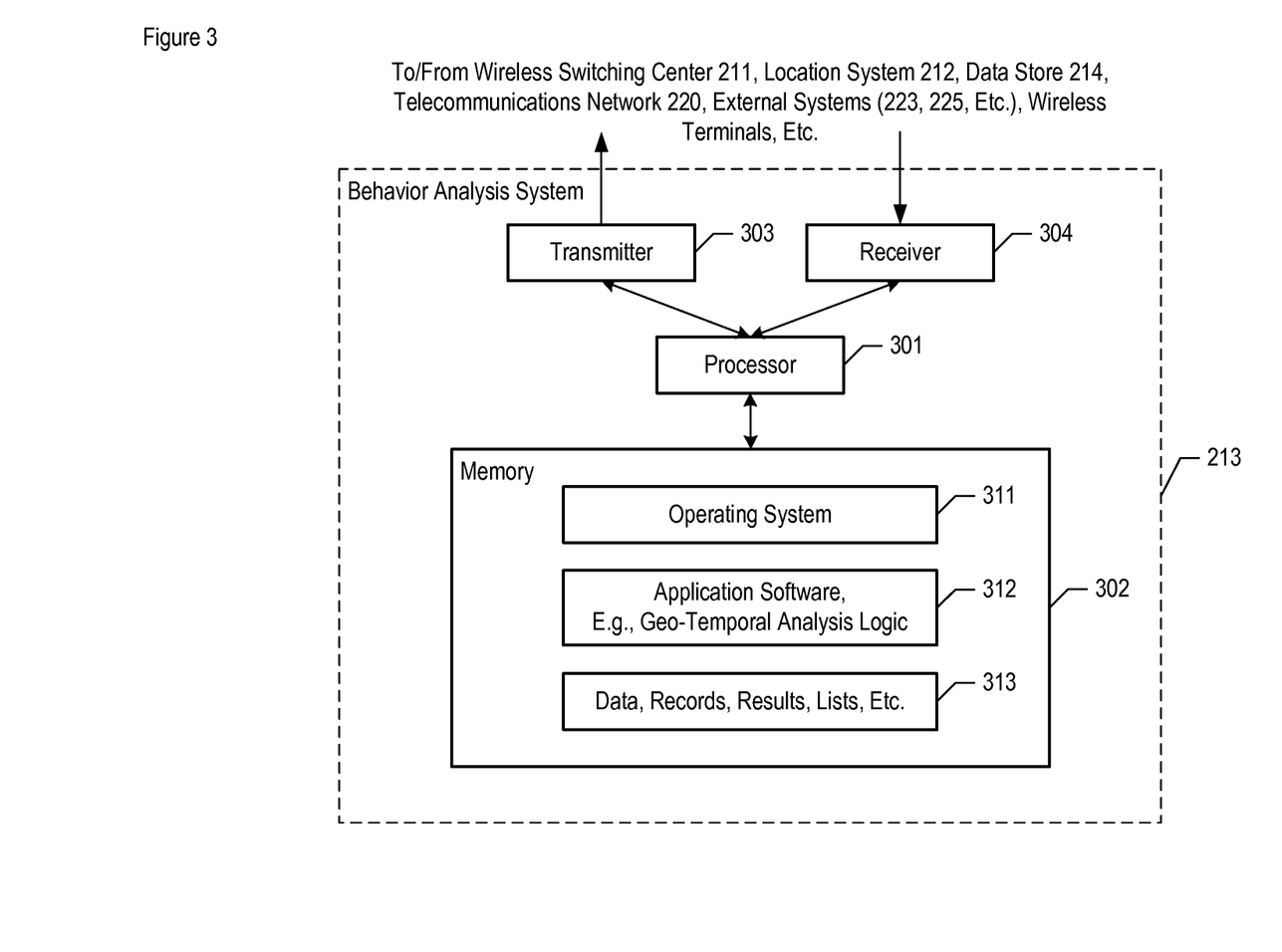
FIG. 3 depicts a block diagram of the salient components of geo-temporal analysis system 213 in accordance with the illustrative embodiment.

FIG. 3 depicts a block diagram of the salient components of geo-temporal analysis system 213 in accordance with the illustrative embodiment. Illustrative embodiment 213 is a data-processing system that comprises as part of its hardware platform: processor 301, memory 302, and transmitter 303 and receiver 304.

Processor 301 is a processing device such as a microprocessor that is well known in the art. When operating in conjunction with the other components of illustrative embodiment 213, processor 301 executes the software, processes data, and telecommunicates according to the operations described herein.

Memory 302 is non-transitory and non-volatile computer memory technology that is well known in the art. Memory 302 stores operating system 311, application software 312, and element 313 which comprises data, records, results, lists, etc. It will be clear to those having ordinary skill in the art how to make and use alternative embodiments that comprise more than one memory 302; or subdivided segments of memory 302; or a plurality of memory technologies that collectively store operating system 311, application software 312, and element 313. The specialized application software 312 that is executed by processor 301 is illustratively denominated the "geo-temporal analysis logic" that enables geo-temporal analysis system 213 to perform the operations of method 400.

Transmitter 303 is a component that enables illustrative embodiment 213 to telecommunicate with other components internal and external to wireless network 200 by transmitting signals thereto. For example, transceiver 303 enables telecommunication pathways to wireless switching center 211, location system 212, data store 214, etc. within wireless network 200, as well as to other systems that are external to wireless network 200, such as telecommunications network 220, a surveillance system, a tracking system, a financial system, another wireless network, etc., without limitation. Transmitter 303 is well known in the art. It will be clear to those having ordinary skill in the art how to make and use alternative embodiments that comprise more than one transmitter 303.

Receiver 304 is a component that enables illustrative embodiment 213 to telecommunicate with other components internal and external to wireless network 200 by receiving signals therefrom. For example, receiver 304 enables telecommunication pathways from wireless switching center 211, location system 212, data store 214, etc. within wireless network 200, as well as from other systems that are external to wireless network 200, such as telecommunications network 220, a surveillance system, a financial system, a tracking system, another wireless network, etc., without limitation. Receiver 304 is well known in the art. It will be clear to those having ordinary skill in the art how to make and use alternative embodiments that comprise more than one receiver 304.

It will be clear to those skilled in the art, after reading the present disclosure, that in alternative embodiments the data-processing hardware platform of geo-temporal analysis system 213 can be embodied as a multi-processor platform, as a server, as a sub-component of a larger computing platform, or in some other computing environment—all within the scope of the present invention. It will be clear to those skilled in the art, after reading the present disclosure, how to make and use the data-processing hardware platform for geo-temporal analysis system 213.

FIG. 4 depicts a flowchart of the salient operations of method 400 according to the illustrative embodiment of the present invention. Geo-temporal analysis system 213 executes and coordinates the operations of method 400 in accordance with the illustrative geo-temporal analysis logic.

At operation 401, geo-temporal analysis system 213 receives a plurality of data and a pre-defined geo-temporal pattern. Operation 401 is described in more detail in a subsequent figure. It will be clear to those having ordinary skill in the art, after reading the present disclosure, how to make and use alternative embodiments wherein no pre-defined geo-temporal pattern is received, such as wherein geo-temporal analysis system 213 generates rather than receives this geo-temporal pattern, or, alternatively, wherein there is no pre-defined geo-temporal pattern to start with.

At operation 403, geo-temporal analysis system 403 filters the records. This operation results in a corresponding set of candidate wireless terminals that are to be further evaluated according to the subsequent operations of method 400. Operation 403 is described in more detail in a subsequent figure.

At operation 405, for each candidate in the set of candidate wireless terminals, geo-temporal analysis system 213 generates a geo-temporal pattern that is based on data from those records that are associated with the respective candidate—and particularly on the geo-temporal attributes gleaned from those records. Depending on the particular implementation, only some of the records might be selected as the basis for generating the geo-temporal pattern.

Illustratively, the geo-temporal pattern is generated from analyzing a plurality of records for each candidate, gathered over a period of time such as one month, the plurality of records comprising one or more of the following without limitation:

records that report on telecommunications events—as received in operation 501,
records that report on other events that are not telecommunications events—as received at operation 503,
tracking records—as received in operation 505,
activation records—as received in operation 507, and
deactivation records—as received in operation 507.

The geo-temporal analysis logic in geo-temporal analysis system 213 extracts the geo-temporal data from the available records such that a plurality of geo-temporal data points is available for each wireless terminal so that a geo-temporal pattern can be generated therefrom.

In addition to the records, geographic information—as received in operation 509—is also available for further analyzing a candidate's records. For example, location data from the records can be correlated or refined according to the geographic information to determine whether, for example, a location is known to be outdoors, e.g., a park, a lake, a street; or indoors, e.g., within the footprint of a high-rise building or a warehouse.

Illustrative examples of geo-temporal patterns for a given wireless terminal include one or more of the following, alone or in combination with each other, without limitation:
- the set of locations visited by the wireless terminal over a given period of time,
- the set of locations where the wireless terminal spends more than a certain amount of time, e.g., more than 30 minutes,
- the set of locations where the wireless terminal spends a certain amount of time, e.g., between 15 minutes and 75 minutes,
- the location of the wireless terminal at a certain point in time, e.g., noon, every weekday.

The variety, granularity, periodicity, combinations, and complexity of geo-temporal patterns will vary based on the geo-temporal attributes surrounding the respective investigation. Also, the operative period of time for determining the geo-temporal pattern also will vary, e.g., a month, a year, etc. The geo-temporal attributes to be considered in generating a geo-temporal pattern for the candidate wireless terminals will vary from investigation to investigation. Illustrative examples of geo-temporal attributes are given elsewhere herein.

After the proper attributes (e.g., geo-temporal attributes and other attributes), operational period of time, and other relevant considerations are defined for an investigation according to the illustrative embodiment, geo-temporal analysis system 213 uses machine learning techniques that are well known in the art to generate the geo-temporal pattern for each candidate wireless terminal. It will be clear to those having ordinary skill in the art, after reading the present disclosure, how to make and use alternative embodiments wherein other techniques generate the geo-temporal pattern, or wherein a combination of machine learning and other techniques is used.

At operation 406, geo-temporal analysis system 213 measures how precisely each candidate's geo-temporal pattern matches the pre-defined geo-temporal pattern. The geo-temporal analysis logic in geo-temporal analysis system 213 compares one geo-temporal pattern to another and evaluates a proper measure of preciseness between them. The measure depends on the nature of the geo-temporal attributes in the geo-temporal patterns being compared. Some measures are quantitative and some are qualitative. Illustratively, the pre-defined geo-temporal pattern comprises:
- from January through June of the present year, the set of locations where a wireless terminal spends between 15 minutes and 75 minutes daily includes coffee shop C and park P.

Illustratively, the geo-temporal pattern of the candidate wireless terminal comprises:
- the set of locations where the candidate wireless terminal spends between 15 minutes and 75 minutes comprises coffee shop C and park P
- on 3 to 7 days per week but not daily during the period from January through June of the present year.

Accordingly, a first illustrative measure of preciseness according to the present operation comprises a comparison of the corresponding geo-temporal attributes:
- the set of locations where the candidate wireless terminal spends between 15 and 75 minutes comprises locations C and P, which is considered by geo-temporal analysis system 213 to be a match to the pre-defined pattern, and occurs 3-7 days per week rather than daily, which is also considered by geo-temporal analysis system 213 to be a match to the pre-defined pattern.

Illustratively then, according to the first illustrative measure of preciseness, as computed by the geo-temporal analysis logic in geo-temporal analysis system 213, there is a match between the geo-temporal pattern of the candidate wireless terminal and the pre-defined geo-temporal pattern.

A second illustrative measure of preciseness requires a "perfect" match, including daily visits to locations C and P, which the candidate wireless terminal has not demonstrated over the operative time period of January to June of the present year. Therefore, according to this second illustrative measure of preciseness, the geo-temporal analysis logic in geo-temporal analysis system 213 determines that there is no match between the geo-temporal pattern of the candidate wireless terminal and the pre-defined geo-temporal pattern.

These simple illustrative examples are presented here for clarity. As noted, a proper measure of preciseness depends closely on the nature of the relevant geo-temporal attributes and is specific to the details of the investigation and the data that are available to the geo-temporal analysis system. For example, the investigator might have intelligence that suggests that a known terrorist meets with a close collaborator every day, and therefore someone who does not satisfy a daily criterion is not considered by geo-temporal analysis system 213 to be a proper match or is ranked by the system into a lower category of interest for the investigator. It is therefore left to the discretion of the implementers to define a measure of preciseness that is suitable to the needs of the investigation at hand. The geo-temporal analysis logic is capable of accepting varying levels of sensitivity settings for measuring and comparing the geo-temporal patterns. The levels of sensitivity are directed at the level of inclusiveness in the ultimate set of results produced by geo-temporal analysis system 213.

At operation 407, geo-temporal analysis system 213 measures how precisely each candidate's geo-temporal pattern matches the geo-temporal pattern of each of the other candidate wireless terminal in a manner analogous to operation 406 as described above. Thus, in the present operation, the geo-temporal logic in geo-temporal system 213 measures how precisely a first geo-temporal pattern of a first candidate wireless terminal matches a second geo-temporal pattern of a second candidate wireless terminal. As explained above, a proper measure of preciseness depends closely on the nature of the relevant geo-temporal attributes and is specific to the details of the investigation and the data that are available to the geo-temporal analysis system. It is therefore left to the discretion of the implementers to define a measure of preciseness that is suitable to the needs of the investigation at hand.

Notably, in regard to operations 406 and 407, candidate wireless terminals are evaluated based on a geo-temporal pattern generated from records covering a relatively extended operational period of time in the past, e.g., a month, six months, a year, etc. Therefore, the present analysis is distinguishable from real-time fraud-detection and anti-spoofing (anti-counterfeiting) techniques that are generally known in the art. One typical prior-art technique evaluates a call origination from a given mobile phone by comparing some parameters of the originating call attempt, e.g., the dialed number and/or the time of day, with an existing calling profile for the mobile; the technique determines in real-time whether the originating call attempt fits the existing calling profile and either allows the originating call to proceed or blocks the call. This prior-art technique evaluates a call attempt against a profile that includes past call destinations and may include locational data associated with past calls; the locational data is typical of the imprecision in the prior art, i.e., cell ID or enhanced cell ID. In contrast, the present analysis is not concerned with incipient calls and is not a call-control technique. Moreover, the illustrative embodiment is independent of whether the past calls were legitimate or fraudulent, authorized to proceed or blocked, and furthermore focuses on geo-temporal analysis that is independent of the calling profile. As noted, the present invention is directed at circumventing the possible absence of a calling history between actors, and is directed instead at analyzing geo-temporal data other than direct telecommunications.

Figure 7:
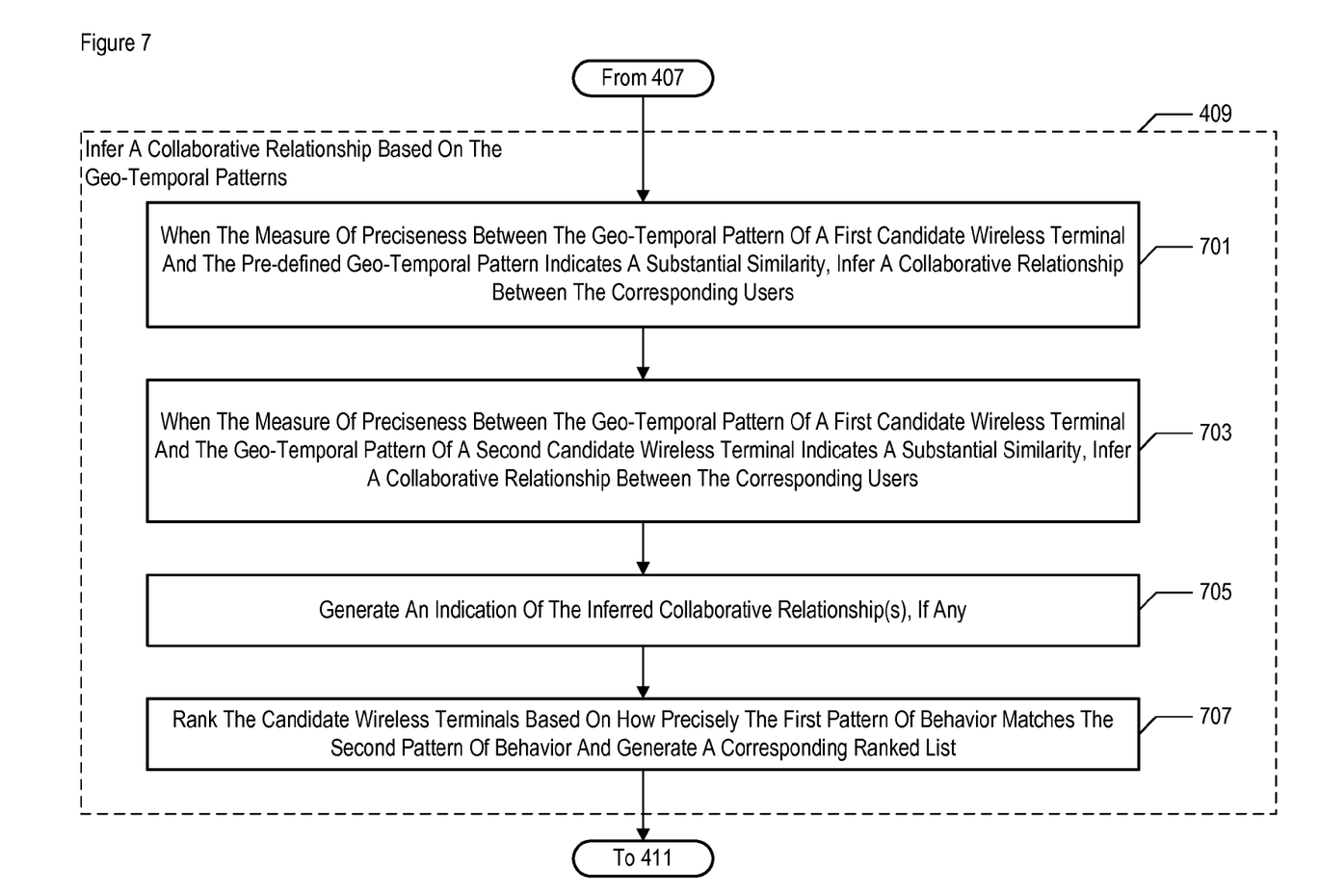
FIG. 7 depicts a flowchart of the salient sub-operations of operation 409 performed in accordance with the illustrative embodiment.

At operation 409—which is described in more detail in a subsequent figure—based on the preceding measures of preciseness, geo-temporal analysis system 213 infers a collaborative relationship, if any, as between a first user of a first candidate wireless terminal and another (second) user and generates a corresponding indication of the inference. For example, the other (second) user could be the user corresponding to the pre-defined geo-temporal pattern from operation 401/511; the other (second) user could alternatively be the user of a second candidate wireless terminal; or the other (second) user could be the user of the pre-defined pattern and also the user of a second candidate wireless terminal. Illustratively, the first user is the user of wireless terminal 201 and the second user is the user of wireless terminal 210.

It should be noted that the present technique works even when the first user and the second user have no (or substantially no) direct telecommunications between them according to the received telecommunications-event records. The geo-temporal analysis system 213 is capable of evaluating the received telecommunications-event records to determine whether direct telecommunications has occurred between two wireless terminals. Because the geo-temporal patterns are preferably based on geo-temporal data and not on direct telecommunications between two candidate wireless terminals, whether or not such direct telecommunications are indicated by the received records is preferably immaterial to the operations herein. As noted, the geo-temporal pattern analysis is rooted in people's locations and/or movement over time, and not in their mutual telecommunications.

It will be clear to those having ordinary skill in the art, after reading the present disclosure, that geo-temporal analysis system 213 is capable of inferring and indicating that no collaborative relationship can be inferred from the available data; or that the results are inconclusive. It will be further clear to those having ordinary skill in the art, after reading the present disclosure, that geo-temporal analysis system 213 is capable of inferring that more than two users have mutually collaborative relationships or that a user has a first collaborative relationship with a first person and a second collaborative relationship with a second person.

Thus, in the present operation, geo-temporal analysis system 213, based on the measure(s) of preciseness, infers a collaborative relationship (if any) between a first user of a first candidate wireless terminal and a second user who corresponds to the second geo-temporal pattern. The second geo-temporal pattern might be the pre-defined geo-temporal pattern or a geo-temporal pattern generated by geo-temporal analysis system 213 for a second candidate wireless terminal. The measure of preciseness might be sufficient to infer the collaborative relationship between the first user and the second user, or it might indicate a partial match. It is left to the implementers of geo-temporal analysis system 213 to define when a measure of preciseness is sufficient to infer the collaborative relationship.

At operation 411, geo-temporal analysis system 213 transmits one or more requests for location estimates of the wireless terminals of the above-mentioned first user and second user. When the pre-defined geo-temporal pattern is not associated with a known wireless terminal, i.e., the pattern might be based on attributes that are relevant in an investigation but there is no pre-identified wireless terminal, there is no second wireless terminal for which a request for a location estimate is generated and transmitted. On the other hand, when geo-temporal analysis system 213 infers that two or more candidates have a collaborative relationship, system 213 transmits requests for the respective locations of the respective candidate wireless terminals.

Geo-temporal analysis system 213 illustratively transmits each location request to location system 212. It will be clear to those having ordinary skill in the art, after reading the present disclosure, how to make and use alternative embodiments wherein the request is transmitted to another element of wireless network 200, e.g., wireless switching center 211, or to another system that is external to wireless network 200. The location request, and the respective location estimate that is received by geo-temporal analysis system 213 in response, enable an investigator to begin tracking or surveilling the suspect wireless terminal.

At operation 413, geo-temporal analysis system 213 transmits the measures of preciseness, the set(s) of candidates, and/or an indication of the inferred collaborative relationship to a display, to another system, to a wireless terminal, and/or to a data store, etc., without limitation. Illustratively, geo-temporal analysis system 213 transmits the measures of preciseness computed in operations 406 and 407 and the outcome of operation 409 to a display that is attached to geo-temporal analysis system 213, to another wireless terminal in network 200 (that is illustratively carried by someone in the vicinity of one of the inferred collaborators), to an external surveillance system operated by law enforcement authorities, and also to data store 214. Geo-temporal analysis system 213 also archives the records and other data that formed the basis for operations 401 through 409 to data store 214.

It will be clear to those having ordinary skill in the art, after reading the present disclosure, how to make and use alternative embodiments of method 400 wherein the operations are differently sequenced, grouped, or sub-divided—all within the scope of the present invention. It will be further clear to those skilled in the art, after reading the present disclosure, how to make and use alternative embodiments of method 400 wherein some of the recited operations are omitted or are executed by other elements of wireless network 200 and/or by systems that are external to wireless network 200.

FIG. 5 depicts a flowchart of the salient sub-operations of operation 401 performed in accordance with the illustrative embodiment.

At operation 501, geo-temporal analysis system 213 receives records that report on telecommunications events experienced by wireless terminals in wireless network 200, wherein each record comprises geo-temporal data associated with the respective telecommunications event, illustratively a geo-temporal datum documenting the location and point in time that the telecommunications event is estimated to have occurred. Illustratively, these records are generated by and received from wireless switching center 211, but in alternative embodiments, these records are received from another element of network 200, e.g., location system 212, are received from an external system, or are generated by geo-temporal analysis system 213, or a combination of one or more of these sources of records.

Illustrative examples of telecommunications-event records that report on telecommunications events that were experienced by a given wireless terminal include without limitation:

a record wherein the wireless terminal received a call at a first location $L_1$ at time $T_1$, a record wherein the wireless terminal originated a call at a second location $L_2$ at time $T_2$, a record wherein the wireless terminal executed a call transfer at a third location $L_3$ at time $T_3$, a record wherein the wireless terminal received a text message at a fourth location $L_4$ at time $T_4$, and a record wherein the wireless terminal originated a text message at a fifth location $L_5$ at time $T_5$, a record wherein the wireless terminal powered up at a sixth location $L_6$ at time $T_6$, a record wherein the wireless terminal requested a location area update at a seventh location $L_7$ at time $T_7$, a record wherein the wireless terminal powered down at an eighth location $L_8$ at time $T_8$, a record wherein the wireless terminal attached to a packet radio data network in the wireless network at a ninth location $L_9$ at time $T_9$, and a record wherein the wireless terminal detached from the packet radio data network in the wireless network at a tenth location $L_{10}$ at time $T_{10}$.

As noted earlier, any number of other telecommunications events are recorded and reported on in corresponding telecommunications-event records that are associated with the given wireless terminal.

At operation 503, geo-temporal analysis system 213 receives records that report on other events that are not telecommunications events that occurred at the wireless terminal, wherein each record comprises geo-temporal data associated with the respective event, illustratively a geo-temporal datum documenting the location and point in time that the event is estimated to have occurred. Illustrative examples of other-event records that report on other events that are not telecommunications events but which events are associated with a wireless terminal include without limitation:

a record wherein the wireless terminal was used to conduct a financial transaction at an eleventh location $L_{11}$ at time $T_{11}$, e.g., a purchase, a refund, a deposit, a transfer of funds, a credit card transaction, a debit card transaction, etc., a record at a twelfth location $L_{12}$ at time $T_{12}$ wherein the wireless terminal accessed an online portal/destination that is of interest, e.g., a bank, a bank account, a credit card account, a debit card account, an Internet domain, a Universal Resource Locator ("URL"), etc., a record at a thirteenth location $L_{13}$ at time $T_{13}$ wherein the wireless terminal received data from a source that is of interest, e.g., a bank, a financial institution, a person, or another entity, an IP address, an Internet domain, an Internet address, etc., a record at fourteenth location $L_{14}$ at time $T_{14}$ wherein the wireless terminal transmitted data to a destination that is of interest, e.g., a bank, a financial institution, a person, another entity, an IP address, an Internet domain, an Internet address, etc., a record at a fifteenth location $L_{15}$ at time $T_{15}$ wherein the wireless terminal activated a camera device that is part of the wireless terminal, a record at a sixteenth location $L_{16}$ at time $T_{16}$ wherein the wireless terminal activated a video and/or audio-recording device that is part of the wireless terminal.

Illustratively, these records are received from an external system, e.g., a financial system, and from an element of wireless network 200, e.g., a base station, as appropriate. It will be further clear to those having ordinary skill in the art, after reading the present disclosure, how to record and report on any number of other events, and further how to collect, construct, generate, and/or receive any number of corresponding other-event records including the associated geo-temporal data therein.

At operation 505, geo-temporal analysis system 213 receives tracking records, including associated geo-temporal data, corresponding to at least some of the wireless terminals in wireless network 200, e.g., GPS records, video records, surveillance records, roadway-traffic camera records, tollbooth records, etc. without limitation from an appropriate system.

The events leading to these records are examples of other events that are not telecommunications events, and hence the records are other-event records. It will be clear to those having ordinary skill in the art, after reading the present disclosure, how to record, collect, construct, generate, and/or receive (and process if necessary) the records recited in the present operation such that each record is associated with a particular user and/or wireless terminal (e.g., a record that associates a user's wireless terminal with a pass through a toll booth; or a record that associates a user's wireless terminal with being in a particular surveilled geographical area; etc.)

At operation 507, geo-temporal analysis system 213 receives activation records and deactivation records for at least some of the wireless terminals in wireless network 200, wherein each record comprises geo-temporal data associated with the respective activation/deactivation, corresponding to a wireless terminal being activated (i.e., an account being created) or deactivated (i.e., the subscriber account being terminated or turned off) in wireless network 200. Illustratively, these records are received from an account-management element of wireless network 200, but in alternative embodiments they could be received from an external account-management system or form another wireless network.

The events leading to these activation/deactivation records are examples of other events that are not telecommunications events, and hence the records are other-event records. It will be clear to those having ordinary skill in the art, after reading the present disclosure, how to record, collect, construct, generate, and/or receive (and process if necessary) the records recited in the present operation such that each record is associated with a particular user and/or wireless terminal (e.g., a record of when and where a subscriber account was activated, etc.).

At operation 509, geo-temporal analysis system 213 receives data from a Geographic Information System ("GIS") that is well known in the art, and/or from a similar source of electronic maps. The received data comprises electronic maps and information about the terrain covered by wireless network 200, for example indicating where there are water surfaces, parks, streets, buildings, etc. This information may be optionally correlated to the geo-temporal data to develop, generate, and analyze geo-temporal patterns that comprise useful additional attributes, such as indoor/outdoor attributes, etc.

At operation 511, geo-temporal analysis system 213 receives a pre-defined geo-temporal pattern. The geo-temporal pattern is based on one or more geo-temporal attributes. When the pre-defined geo-temporal pattern is associated with a known person of interest who used a known wireless terminal, the pattern is based on that person's geo-temporal data and corresponding geo-temporal attributes. Notably, the pre-defined geo-temporal pattern need not be associated with a known person or wireless terminal, such as when an investigator is monitoring a suspected gathering place but has not specifically identified a known suspect or a known suspect wireless terminal at that location. The investigator can define the geo-temporal attributes of the pre-defined geo-temporal pattern, such as someone who regularly visits a given location and also makes calls to certain countries of interest, not necessarily from the given location.

Illustrative examples of geo-temporal attributes include one or more of the following, alone or in combination, without limitation:

- A location and a point in time, e.g., location H at 10 am on Jul. 11, 2012;
- A location and a period of time, e.g., location H from 9:30 to 10:30 am on Jul. 11, 2012;
- A location and a duration of time after arrival at that location, e.g., location H from arrival time until departure from location H;
- A location and a duration of time when no calls are made or received on the wireless terminal at that location;

It will be clear to those having ordinary skill in the art, after reading the present disclosure, how to define and use other geo-temporal attributes upon which a geo-temporal pattern can be based—all within the scope of the present invention.

It will be clear to those having ordinary skill in the art, after reading the present disclosure, how to make and use alternative embodiments wherein, rather than receiving the pre-defined geo-temporal pattern, geo-temporal analysis system 213 receives records associated with a person of interest—records of the kind described in operations 501 through 509—and further wherein geo-temporal analysis system 213 generates the pre-defined geo-temporal pattern from these received records. It will be further clear to those having ordinary skill in the art, after reading the present disclosure, how to make and use alternative embodiments without operation 511, i.e., wherein there is no pre-defined geo-temporal pattern; in such embodiments, geo-temporal analysis system 213 seeks to identify from among the set of candidate wireless terminals those candidates that have identical or substantially similar geo-temporal patterns as to each other.

Figure 6:
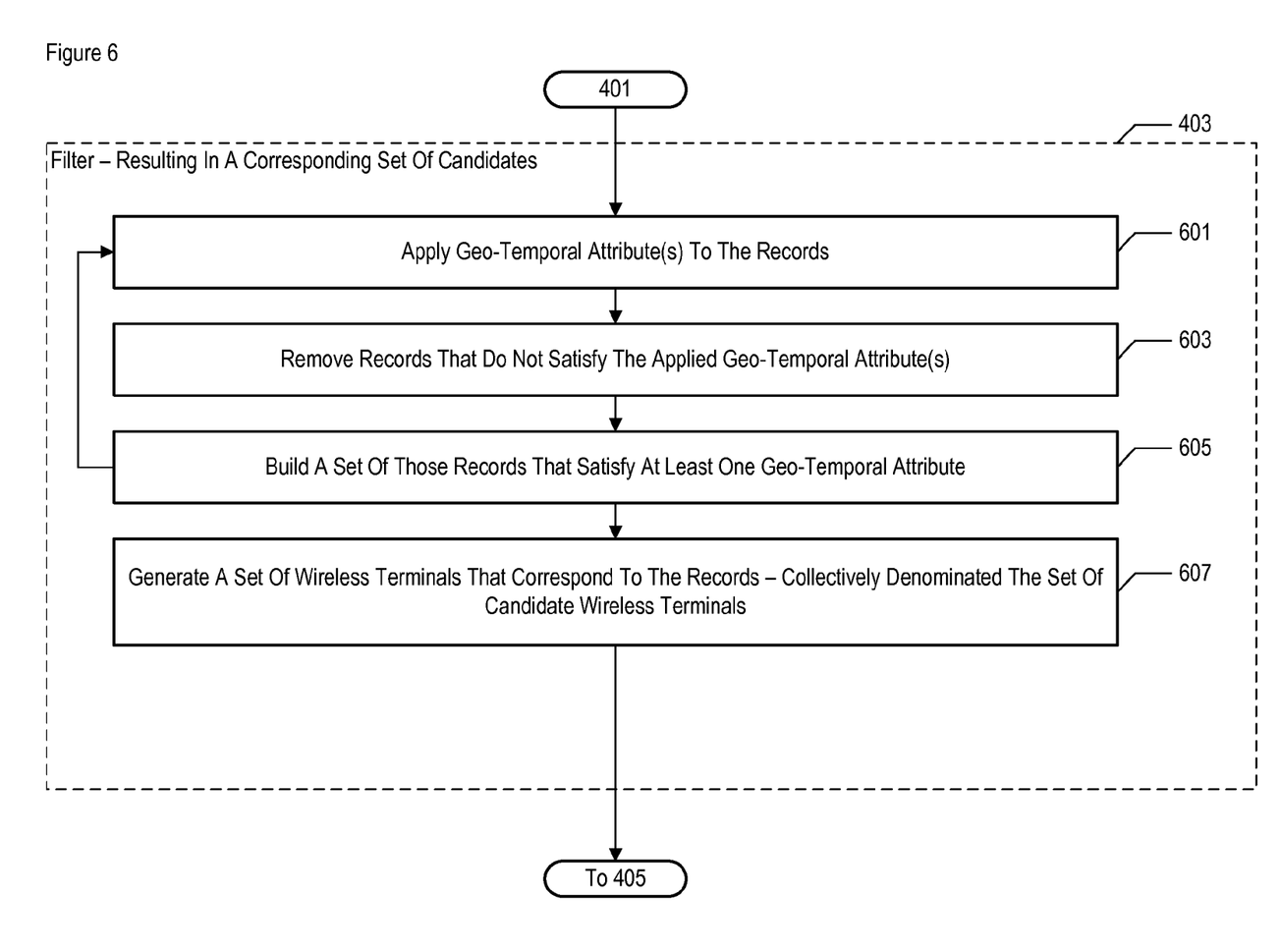
FIG. 6 depicts a flowchart of the salient sub-operations of operation 403 performed in accordance with the illustrative embodiment.

FIG. 6 depicts a flowchart of the salient sub-operations of operation 403 performed in accordance with the illustrative embodiment.

At operation 601, geo-temporal analysis system 213 applies one or more geo-temporal attributes to the received records. Typically, these geo-temporal attributes are associated with the pre-defined geo-temporal pattern described in operation 511, or they are chosen because they are relevant to the investigation. Illustrative examples of geo-temporal attributes were given in regard to operation 511.

At operation 603, geo-temporal analysis system 213 removes from further consideration those records that do not satisfy any of the applied geo-temporal attributes. For example, if one of the relevant geo-temporal attributes comprises a certain period of time, records that fall outside that period of time are removed according to this operation.

At operation 605, geo-temporal analysis system 213 builds a set of records that satisfy at least one of the applied geo-temporal attributes. Thus, according to the illustrative embodiment, the set of records comprises those records that satisfy one or more of the applied geo-temporal attributes.

It will be clear to those having ordinary skill in the art, after reading the present disclosure, how to make and use alternative embodiments wherein, because no pre-defined geo-temporal pattern was received at operation 511, there are no geo-temporal attributes to apply to the records and hence operations 601 through 605 are skipped. It will be further clear to those having ordinary skill in the art, after reading the present disclosure, how to make and use alternative embodiments wherein, even when a pre-defined geo-temporal pattern was received at operation 511, geo-temporal analysis system 213 skips operations 601 through 605.

At operation 607, geo-temporal analysis system 213 completes the filtering operation recited in operation 403 by generating a set of wireless terminals that correspond to the relevant set of records; this set is collectively denominated the set of candidate wireless terminals, because every wireless terminal in this set is a candidate to be possibly identified as a collaborator according to the operations that follow the present operation. Notably, when no pre-defined geo-temporal pattern was received and/or generated in operation 511, operations 601 through 605 are not executed, and therefore the set of candidate wireless terminals corresponds to all the records received in operation 401. When operations 601 through 605 are executed and some of the records are removed, the set of candidate wireless terminals that is generated in the present operation comprises only those wireless terminals that have records that satisfy one or more of the applied geo-temporal attributes.

Notably (although not expressly depicted in regard to operation 403) the illustrative system is capable of evaluating the available telecommunications-event records to determine whether there is direct telecommunications between a first wireless terminal and a second wireless terminal. Optionally, when direct telecommunications are found as between two wireless terminals, the illustrative system removes the corresponding records from further consideration in order to better detect the geo-temporal patterns as between candidates. Optionally, when no direct telecommunications are found as between two candidate wireless terminals, the illustrative system generates an indication thereof for later reference; likewise, when direct telecommunications are found as between two candidates, the illustrative system generates an indication thereof for later reference. Optionally, the illustrative system includes the indications in the ranked list of candidates that it generates at operation 707.

FIG. 7 depicts a flowchart of the salient sub-operations of operation 409 performed in accordance with the illustrative embodiment.

At operation 701, when the measure of preciseness between the geo-temporal pattern of a first candidate wireless terminal and the pre-defined geo-temporal pattern indicates a substantial similarity, geo-temporal analysis system 213 infers that there is a collaborative relationship between the corresponding users. It is left to the implementers of geo-temporal analysis system 213 to define when a substantial similarity is sufficient to infer the collaborative relationship.

At operation 703, when the measure of preciseness between the geo-Temporal pattern of a first candidate wireless terminal and the geo-Temporal pattern of a second candidate wireless terminal indicates a substantial similarity, geo-temporal analysis system 213 infers a collaborative relationship between the corresponding users. It is left to the implementers of geo-temporal analysis system 213 to define when a substantial similarity is sufficient to infer the collaborative relationship.

At operation 705, geo-temporal analysis system 213 generates an indication of the inferred collaborative relationships, if any, according to the outcomes of operations 701 through 703.

As noted in regard to the measures of preciseness, the operative analysis of whether there is a substantial similarity between two geo-temporal patterns sufficient to infer a collaborative relationship between the corresponding users is an investigation-dependent decision that is for the implementers of the present invention to decide. Such decisions will depend closely on the nature of the relevant attributes and measures of preciseness used in a given analysis, and are specific to the investigation and the data that are available to geo-temporal analysis system 213 to process and analyze.

At operation 707, geo-temporal analysis system 213 ranks the candidate wireless terminals based on how precisely the first geo-temporal matches the second geo-temporal and generates a corresponding ranked list of candidates. The ranking scheme is based on the measures of preciseness from operations 406 and 407. In such a scheme, geo-temporal analysis system 213 ranks candidate wireless terminals according to how precisely each candidate's geo-temporal pattern matches the pre-defined geo-temporal pattern and/or another candidate's geo-temporal pattern. Ranking candidates provides an added dimension to the analysis and tends to diminish the rate of false positives. Ranking may be used instead of operations 701 and 703, or in combination with them. As noted, different sensitivity levels can be optionally established in measuring preciseness, thus possibly yielding different outcomes in the ranking.

As noted earlier, it will be clear to those having ordinary skill in the art, after reading the present disclosure, how to make and use alternative embodiments wherein those operations described herein that depend upon a pre-defined geo-temporal pattern are skipped or omitted. Likewise, it will be further clear to those having ordinary skill in the art, after reading the present disclosure, how to make and use alternative embodiments wherein those operations described herein that depend upon comparing geo-temporal patterns between candidate wireless terminals are skipped or omitted.

It is to be understood that the disclosure teaches just some examples according to illustrative embodiments of the present invention and that many variations of the present invention can be devised by those skilled in the art after reading this disclosure. The scope of the present invention is to be determined by the following claims.

What is claimed is:

1. A system comprising:
   a receiver for receiving a first plurality of records that are associated with a first wireless terminal;
   a processor for generating, when a first geo-temporal pattern of the first wireless terminal is substantially similar to a second geo-temporal pattern, an indication of a collaborative relationship between a first user of the first wireless terminal and a second user who corresponds to the second geo-temporal pattern, wherein the first geo-temporal pattern is based on location data in the first plurality of records, the location data comprising a datum that indicates the location at which a telecommunications event is estimated to have occurred, and wherein the first geo-temporal pattern is determined by considering a composite of attributes of the first wireless terminal that are defined for an investigation, the composite including at least one geo-temporal attribute; and
   a transmitter for transmitting, when the indication of the collaborative relationship is generated, i) a request for a location estimate of the first wireless terminal and ii) the indication of the collaborative relationship to another wireless terminal in the vicinity to one of the first user and the second user.

2. The system of claim 1 wherein the first plurality of records comprises telecommunications-event records indicating no direct telecommunications between the first wireless terminal and a second wireless terminal used by the second user.

3. The system of claim 1 wherein the processor is further for at least one of:
   generating the first geo-temporal pattern,
   measuring how precisely the first geo-temporal pattern matches the second geo-temporal pattern to determine whether the first geo-temporal pattern is substantially similar to the second geo-temporal pattern, and
   generating the second geo-temporal pattern, wherein the second geo-temporal pattern is based on location data in a second plurality of records that are associated with a second wireless terminal used by the second user.

4. The system of claim 1 further comprising a receiver for receiving the first plurality of records from at least one of:
   (i) a location system, and
   (ii) a wireless switching center.

5. A method comprising:
   receiving, by a data-processing system, a first plurality of records that are associated with a first wireless terminal;
   when a first geo-temporal pattern of the first wireless terminal is substantially similar to a second geo-temporal pattern, generating, by the data-processing system, an indication of a collaborative relationship between a first user of the first wireless terminal and a second user who corresponds to the second geo-temporal pattern, wherein the first geo-temporal pattern is based on location data in the first plurality of records, the location data comprising a datum that indicates the location at which a telecommunications event is estimated to have occurred, and wherein the first geo-temporal pattern is determined by considering a composite of attributes of the first wireless terminal that are defined for an investigation, the composite including at least one geo-temporal attribute; and
   transmitting, when the indication of the collaborative relationship is generated, i) a request for a location estimate of the first wireless terminal and ii) the indication of the collaborative relationship to another wireless terminal in the vicinity to one of the first user and the second user.

6. The method of claim 5 wherein the first plurality of records comprises telecommunications-event records that indicate no direct telecommunications between the first wireless terminal and a second wireless terminal used by the second user.

7. The method of claim 5 further comprising at least one of:
   generating, by the data-processing system, the first geo-temporal pattern;
   measuring, by the data-processing system, how precisely the first geo-temporal pattern matches the second geo-temporal pattern to determine whether the first geo-temporal pattern is substantially similar to the second geo-temporal pattern; and
   generating, by the data-processing system, the second geo-temporal pattern, wherein the second geo-temporal pattern is based on location data in a second plurality of records that are associated with a second wireless terminal used by the second user.

8. A system comprising:
   a processor for:
      generating a first geo-temporal pattern of a first wireless terminal by considering a composite of attributes of the first wireless terminal that are defined for an investigation, the composite including at least one geo-temporal attribute, wherein the first geo-temporal pattern is based on geo-temporal data in a first plurality of records that are associated with the first wireless terminal, the geo-temporal data comprising a datum that indicates the location and point in time at which a telecommunications event is estimated to have occurred, measuring how precisely the first geo-temporal pattern matches a second geo-temporal pattern, based on the measured preciseness, inferring a collaborative relationship between a first user of the first wireless terminal and a second user who corresponds to the second geo-temporal pattern; and a transmitter for transmitting, when the collaborative relationship is inferred, i) a request for a location estimate of the first wireless terminal and ii) an indication of the collaborative relationship to another wireless terminal in the vicinity to one of the first user and the second user.

9. The system of claim 8 wherein the first plurality of records comprises at least one of:

(i) telecommunications-event records that comprise some of the geo-temporal data, (ii) telecommunications-event records that report on telecommunications events that are non-call-related, and (iii) telecommunications-event records that indicate no direct telecommunications between the first wireless terminal and a second wireless terminal used by the second user.

10. The system of claim 8 wherein the processor is further for at least one of:

evaluating telecommunications-event records in the first plurality of records to determine whether there is direct telecommunications between the first wireless terminal and a second wireless terminal used by the second user, and generating the second geo-temporal pattern, wherein the second geo-temporal pattern is based on geo-temporal data in a second plurality of records that are associated with the second wireless terminal used by the second user.

11. The system of claim 8 further comprising a receiver for receiving the second geo-temporal pattern.

12. A method comprising:

generating, by a data-processing system, a first geo-temporal pattern of a first wireless terminal by considering a composite of attributes of the first wireless terminal that are defined for an investigation, the composite including at least one geo-temporal attribute, wherein the first geo-temporal pattern is based on geo-temporal data in a first plurality of records that are associated with the first wireless terminal, the geo-temporal data comprising a datum that indicates the location and point in time at which a telecommunications event is estimated to have occurred;

measuring, by the data-processing system, how precisely the first geo-temporal pattern matches a second geo-temporal pattern;

inferring by the data-processing system, based on the measured preciseness, a collaborative relationship between a first user of the first wireless terminal and a second user who corresponds to the second geo-temporal pattern; and transmitting, when the collaborative relationship is inferred, i) a request for a location estimate of the first wireless terminal and ii) an indication of the collaborative relationship to another wireless terminal in the vicinity to one of the first user and the second user.

13. The method of claim 12 wherein the first plurality of records comprises at least one of:

(i) telecommunications-event records that comprise some of the geo-temporal data, (ii) telecommunications-event records that report on telecommunications events that are non-call-related, and (iii) telecommunications-event records that indicate no direct telecommunications between the first wireless terminal and a second wireless terminal used by the second user.

14. The method of claim 12 further comprising at least one of:

measuring, by the data-processing system, how precisely the first geo-temporal pattern matches the second geo-temporal pattern;

evaluating, by the data-processing system, the telecommunications-event records to determine whether there is direct telecommunications between the first wireless terminal and a second wireless terminal used by the second user; and generating, by the data-processing system, the second geo-temporal pattern, wherein the second geo-temporal pattern is based on geo-temporal data in a second plurality of records that are associated with the second wireless terminal used by the second user.

* * * * *